Jan. 28, 1969  C. S. COCKERELL  3,424,266
GAS-CUSHION VEHICLES WITH MULTI-STAGE FLEXIBLE
SKIRTS AND ATTITUDE CORRECTING MEANS THEREFOR
Filed Nov. 10, 1966  Sheet 3 of 3
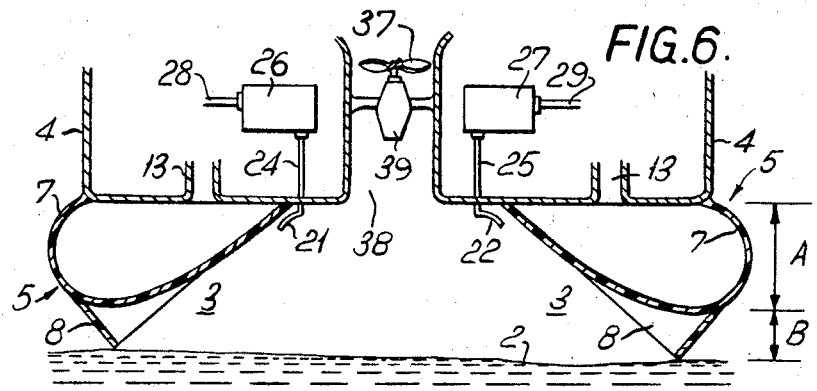
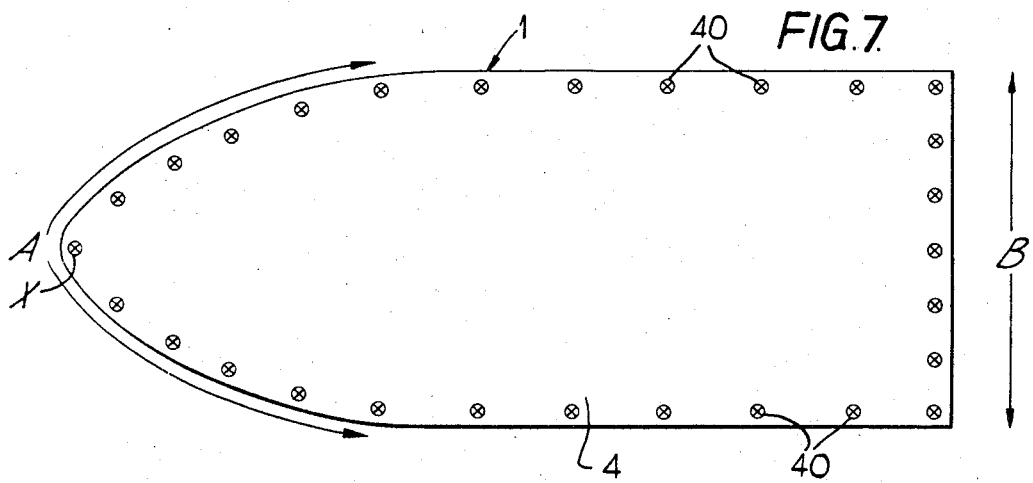
INVENTOR
C. S. COCKERELL
BY Cameron, Kerkam & Sutton
ATTORNEYS

United States Patent Office 3,424,266
Patented Jan. 28, 1969

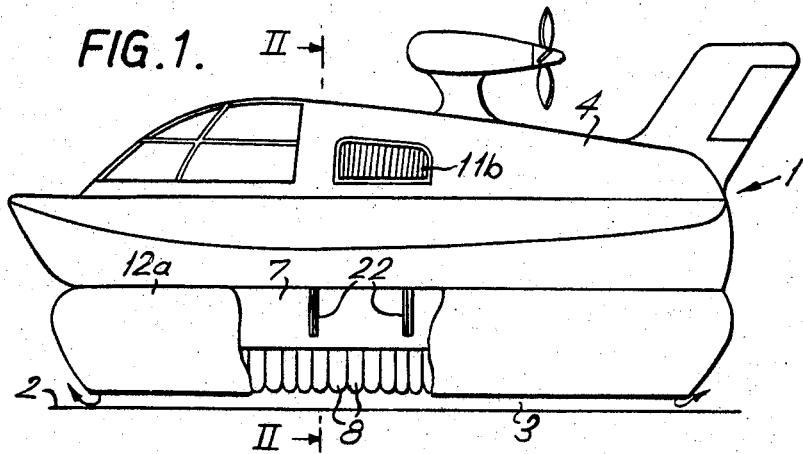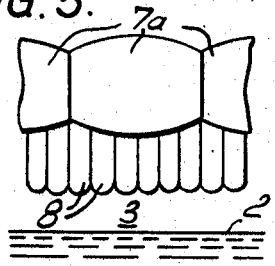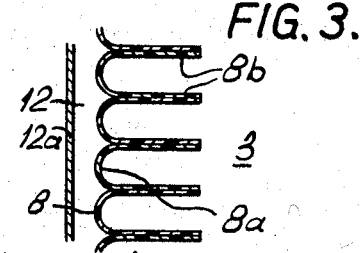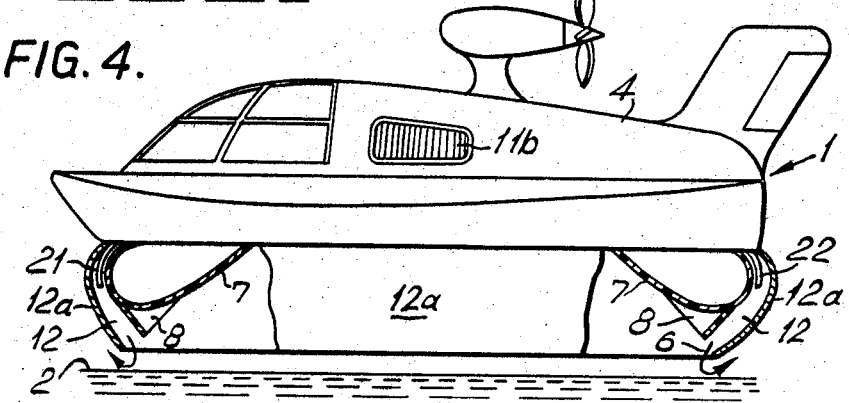

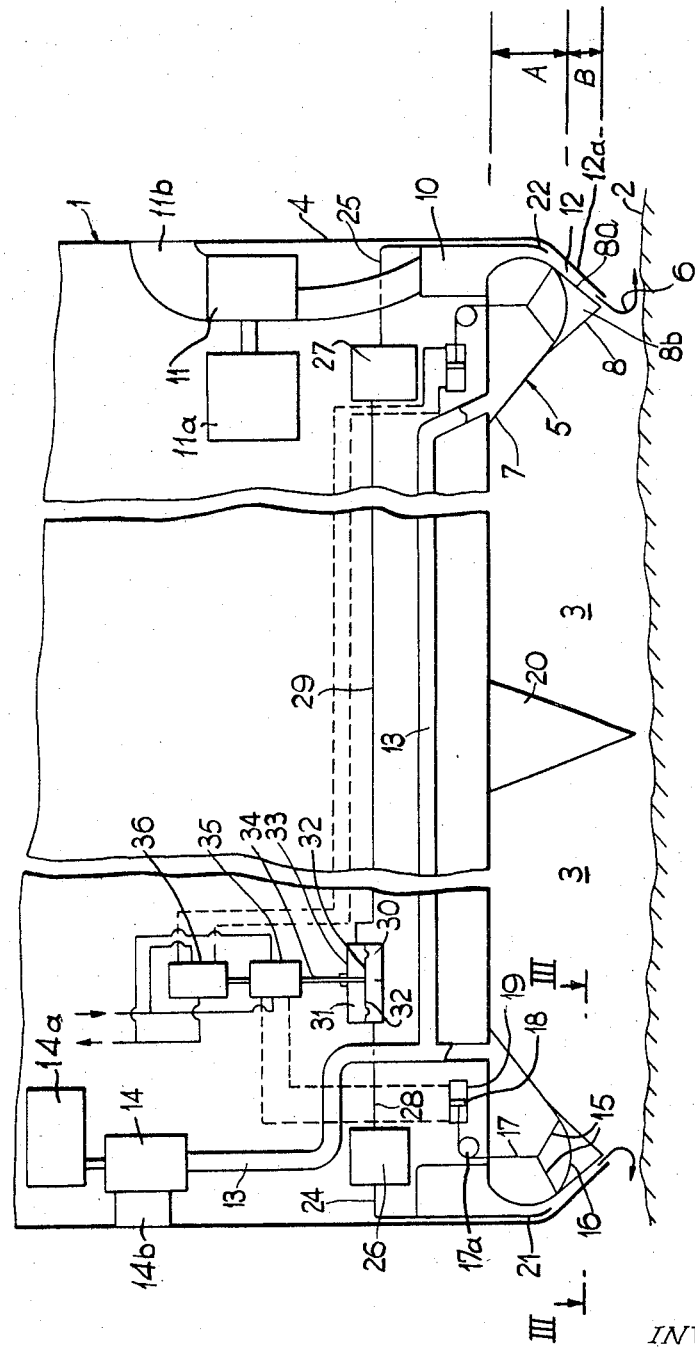

3,424,266
GAS - CUSHION VEHICLES WITH MULTI - STAGE FLEXIBLE SKIRTS AND ATTITUDE CORRECTING MEANS THEREFOR
Christopher Sydney Cockerell, Southampton, England, assignor to Hovercraft Development Limited, London, England, a British company
Continuation-in-part of application Ser. No. 375,496, June 16, 1964. This application Nov. 10, 1966, Ser. No. 593,376
Claims priority, application Great Britain, June 21, 1963, 24,819/63
U.S. Cl. 180—118     10 Claims
Int. Cl. B60v 1/04

ABSTRACT OF THE DISCLOSURE

A gas-cushion vehicle having a cushion-containing wall comprising an inflatable bag and a flexible segmented skirt depending therefrom. The inflatable bag may comprise a series of interconnected sections. The wall may be augmented by fluid curtains caused to flow down the inner or outer surface of the segmented skirt. The attitude of the vehicle may be controlled by moving the wall downwardly at a down-going part thereby creating upward restoring forces. The attitude control may be automatic in response to signals from gyroscopes, accelerometers or surface clearance sensing means.

---

This application is a continuation-in-part of application Ser. No. 375,496 filed June 16, 1964, now Patent No. 3,297,102, and relates to gas-cushion vehicles, that is to say, to vehicles for travelling over a surface and which are supported above that surface, at least in part, by a cushion of pressurised gas formed and contained beneath the vehicle body.

It has already been proposed o contain the vehicle-supporting cushion, at least in part, by a flexible wall structure attached to the vehicle body.

According to the present invention, a gas-cushion vehicle has its cushion contained, at least in part, by a flexible wall structure attached to the vehicle body and comprising a first stage in the form of an inflatable bag projecting part way across the lateral boundary of the cushion and a second stage formed by a series of separate channel-shaped sections of flexible material attached to the first stage so as to project from the first stage across a further part of said boundary.

The lower stage preferably comprises structure of the form described and claimed in copending, commonly owned continuation-in-part application Ser. No. 566,948 of Denys Bliss filed July 21, 1966.

Means may be provided for pulling at least a portion of the flexible wall structure towards the vehicle body.

An embodiment of the invention will now be described by way of example with reference to the accompanying drawings wherein:

FIGURE 1 is a side view, with parts removed, of a gas-cushion vehicle,

FIGURE 2 is the lower part of a section, to an enlarged scale, taken on the lines II—II of FIGURE 1, FIGURE 3 is a section, to an enlarged scale, taken on the lines III—III of FIGURE 2, FIGURE 4 illustrates a modification of FIGURE 1, FIGURE 5 is a side view, similar to part of FIGURE 1, and illustrates another modification thereof, FIGURE 6 is a fragmentary view illustrating diagrammatically a modification of the arrangement shown in FIGURE 2, and FIGURE 7 is a diagrammatic plan view of the vehicle.

With reference to FIGURES 1, 2 and 3, a gas-cushion vehicle 1 is supported above a surface 2 by a cushion 3 of pressurized air formed beneath the vehicle body 4 and contained thereunder in part by a flexible wall structure 5 attached to the vehicle body and in part by an air curtain 6.

The flexible wall structure 5 is of two-stage form, the first stage 7 comprising an inflatable bag of annular form attached to the periphery of the bottom surface of the vehicle body 4 project across the upper part of the lateral boundary of the cushion 3 and a second stage 8 formed by a series of separate channel-shaped sections of flexible material attached to the bag so as to project from the bag across a further, lower, part of said boundary. The remaining or bottom part of the cushion boundary is bounded by the air curtain 6 which flows downwardly over the outer surface of the stage 8 to issue from the bottom thereof so as to provide, in effect, a third stage of cushion containment.

The second stage 8 of the wall structure 5 is of the form described and claimed in said continuation-in-part application Ser. No. 566,948 of Denys Bliss. That is (see particularly FIGURE 3), it comprises a succession of independently deflectable flexible wall members each having an outer portion 8a which extends downwardly and inwardly away from the first stage 7 and which faces the cushion 3 so as to form part of a boundary surface, and a pair of side portions 8b which extend inwardly from said outer portion towards said cushion 3, a side portion 8b of each wall member being contiguous with the adjacent side portion of a neighbouring wall member, the side portions acting as constraining means which constrain the wall members against deflection away from the cushion 3 by the pressure of air therein, whereby inflation of said wall members by cushion air entering between the side portions 8b urges the contiguous side portions of neighbouring wall members towards each other.

The arrangement also provides a three-stage vehicle suspension system, the first two stages of which comprise the above-mentioned stages 7 and 8 and the third, comprises that portion of the cushion 3 trapped between the bottom surface of the inflated bag and the surface 2 and contained by the wall members forming the second stage 8. The trapped portion of the cushion 3 can be considered as a subsidiary cushion of annular form.

The maximum vertical dimension A of (FIGURE 2) the upper stage 7, i.e. the distance between the uppermost and lowermost parts of the upper stage, is preferably at least equal to and, in this example, greater than the maximum vertical dimension B of the lower stage 8, i.e. the distance between the uppermost and lowermost parts of said lower stage.

Air for forming the air curtain 6 is supplied to a duct 10 by a compressor 11 driven by an engine 11a and drawing air in through side intakes 11b. The air flows from the duct 10 to a duct 12 defined by a flexible sheet 12a and the outside of the flexible wall structure 5, the upper edge of the sheet 12a being attached to the vehicle body 4 and the inner face thereof being spaced from and attached to the outside of the flexible wall structure 5, and the air issues from the bottom of the duct 12 as the curtain 6.

The first stage 7 of the wall structure 5 is inflated by air fed to the interior of the bag forming the structure by pipes 13 connected to a compressor 14. The compressor 14 is driven by an engine 14a and takes in atmospheric air through a side intake 14b. Cords 15 (or alternatively, diaphragms) connect the lower portion 16 of the first stage 7 with a series of wires 17 attached to pistons 18 movable in fluid-operated cylinders 19 disposed at intervals around the periphery of the vehicle body 4. The wires 17 are guided by pulleys 17a. Upward movement of the wires 17 pulls the lower portion 16 upwardly against the effect of inflation pressure in the first stage 7. As the second stage 8 is attached to the first stage 7, vertical movement of the latter results in a rise and fall of the former. As the second stage is of flexible material, this can deflect when contacted by irregularities on the surface 2.

The cushion 3 is divided longitudinally into two parallel cushion compartments by a flexible wall member 20 attached to and projecting downwardly from the centre of the bottom surface of the vehicle body 4.

Pressure in the ducts 12 is sensed by port and starboard-disposed series of probes 21, 22 respectively, and applied to actuate the pistons 18 in order to correct variations in attitude of the vehicle 1. As explained hereinafter, this arrangement provides for the detection and control of roll of the vehicle.

The probes 21, 22 are connected by pipes 24, 25 to chambers 26, 27 respectively. The chambers 26, 27 are connected in turn by pipes 28, 29 to compartments 30, 31 formed on opposite sides of a central, flexible diaphragm 32 dividing the interior of a capsule 33. A valve control rod 34 extends upwardly from the diaphragm 32 and is connected to fluid control valves 35, 36 which control the flow of fluid to and from the cylinders 19.

The volumes of the chambers 26, 27 are large compared with the pipes 24, 25, 28, 29. The chambers 26, 27 act as integrating means whereby rapid changes of pressure in the ducts 12, such as occur when the vehicle is travelling over waves having a length which is a submultiple of the vehicle length, will be smoothed out and the pressures in the chambers 26 and 27 will be the same. The vehicle will thus have an attitude in which the bottom surface of its body 4 is parallel to the mean surface level, i.e. horizontal. If, now, the vehicle rolls there will be superimposed on any rapid pressure changes in the duct 12, a long term pressure variation which will pass through one or both of chambers 26, 27, and upset the balance of the capsule 33. If the vehicle rolls to port, a long term pressure rise will occur in the duct 12 at that side and this pressure rise will pass through the chamber 26 to the compartment 30 of the capsule 33. The pressure rise will move the diaphragm 32 upwards, actuating the control valves 35, 36. Actuation of the control valve 35 will cause pressure fluid to flow to one or more of the cylinders 19 associated with the port side portion of the flexible wall structure 5 so as to lower locally the lower portion 16 of the upper stage 7 thereof to reduce the clearance between the bottom of the structure 5 and the surface 2. This will produce an upwardly acting force on the port side of the vehicle which opposes the roll of the vehicle. Similarly the valve 36 operates to cause the lower portion of the upper stage 7 on the starboard side of the vehicle to lift.

When the vehicle 1 is travelling over undulations, e.g. waves having a wave length which is greater than the vehicle length, then the desired fore-to-aft attitude of the vehicle varies from being horizontal until, at wave lengths several times the length of the vehicle, the desired attitude will be such that the bottom surface of the vehicle body 4 is parallel to the mean surface of profile of the undulation. The arrangement of probes, chambers, capsule and control valves described and shown will control the attitude of the vehicle so that it maintains this desired attitude substantially constant. The arrangement illustrated will act automatically to adjust the desired attitude of the vehicle according to whether the vehicle is travelling over short, high frequency undulations, long, low frequency undulations or, as is common, a combination of these undulations.

With reference to FIGURE 4, a sensing and control arrangement can be provided to detect and correct variations in attitude which occur as a result of pitch of the vehicle by placing the probes 21, 22 in the portions of the duct 12 at the fore and aft ends respectively of the vehicle.

Small, fairly rapid irregularities in the surface 2 are accommodated by the air curtain 6 and distortion of the lower stage 8 of the wall structure 5, whilst larger, slower irregularities are accommodated by movement of the upper stage 7 thereof. Normally the lower portion 16 of the upper stage 7 will be held at a mean position so that movements up or down can be provided. It is then possible to lower deliberately the lower portion 16 of the upper stage 7 together with the lower stage 8 when desired. This will reduce the height sealed by the curtain 6 and, because of the presence of the longitudinal centre wall member 20, increase the pressure in those compartments of the cushion which are bounded by that part of the upper stage 7 which has been lowered. The upper stage 7 can be operated in this way either locally or as a whole.

With reference to FIGURE 5, the upper stage 7 can be made more flexible by forming it, sausage-like, from a series of interconnected, independently-deflectable sections 7a of short length, opposite ends of the section 7a being of reduced cross-section. This arrangement results in the application of rather less shear force to the stage 7 than is applied when one portion of the stage 7 of FIGURES 1 to 3 is deflected relative to another portion spaced a short distance from the first portion.

The flexible wall structure 5 is also suitable for a "plenum chamber" vehicle. As shown in FIGURE 6, this arrangement is achieved by simply dispensing with the equipment for forming the air curtain 6 and supplying cushion air direct to the space occupied by the cushion 3 by way of a fan 37 disposed in a duct 38 communicating with the atmosphere. The fan 37 is driven by a variable speed engine 39. In this arrangement also, the probes 21, 22 are disposed within the space occupied by the cushion 3 and adjacent the periphery thereof. Thus, as the vehicle rolls to one side, the probes 21, 22 sense the local change in cushion pressure and these changes results in lifting and lowering of the wall structures 5 at the sides thereof. As in FIGURE 4, placing the probes 21, 22 at the fore and aft ends of the cushion space can result in the control of pitch.

If required, the probes 21, 22 can be flexibly connected to the pipes 24, 25 and disposed adjacent the lower stage 8. This arrangement could result in more sensitive sensing of cushion pressure. The flexible connections between the pipes 24, 25 and probes 21, 22 allow free passage of the vehicle over surface irregularities.

An override or datum-change arrangement can be added to the system if required. Thus, while the power-operated system described above may be controlled by sensing or detecting means actuated as a result of a variation in the attitude of the vehicle, such as in roll, pitch or heave, it is possible to feed into the control other requirements, such as variation in trim of the vehicle which will alter the normal datum setting of the operating mechanism and provide for the particular movement of the wall structure 5 which is necessary to provide the other requirements.

The lower stage 8 of the two-stage system may be of closed, inflatable construction with means for varying its inflation pressure. This would then provide a further means for directly controlling the relationship between the bottom of the lower stage 8 and the surface 2 beneath.

It is possible to provide phase-advance movement of the wall structure 5. Thus, by positioning sensing heads in advance of particular parts of the wall structure 5, the movement of which they control, the particular parts of the structure 5 can be caused to start moving before a variation in attitude becomes apparent. FIGURE 7 is a diagrammatic plan view indicating the positions around the periphery of the vehicle body 4 of pressure-sensing probes 40 similar to the probes 21, 22 of FIGURE 2. The probes 40 can, however, be replaced by probes arranged to sense parameters other than pressure, for example, rate of change of pressure. As pressure-sensing probes, the probes 40 at the front of the vehicle body, for example, over the length A, are connected to the chamber 26 of FIGURE 2, and the probes 40 at the rear of the vehicle body, over the length B, are connected to a chamber 27 of FIGURE 2. The chambers 26, 27 act as integrating systems and are used to control pitching of the vehicle so as to maintain the fore-to-aft attitude of the vehicle substantially constant. The probes 40 along each side of the vehicle body 4 are used to detect and effect control of heaving.

Individual probes 40 can also be used to provide a phase advance system. Thus, the probe 40 right at the front of the vehicle, indicated at X, detects local variations in clearance and this detection will be used to actuate a rearward part of the wall structure 5. Similarly, the side-disposed probes 40 will be caused to actuate, through their associated control valves, parts of the wall structure 5 further towards the rear of the vehicle.

To obtain a higher degree of phase advance, it will be necessary to have some sensing means for sensing variations in surface height in advance of the vehicle, such as by probes projecting from the front of the vehicle, or some forwardly-mounted optical or electronic sensing device.

It will be appreciated that the mean surface, for small rapid undulations, is normally horizontal while for long term undulations the mean surface will eventually be parallel to actual profile, although there are likely to be small rapid undulations superimposed on the long term undulations.

As stated above, various means for sensing variations in attitude of the vehicle can be used. Whilst sensing or detecting movement can be satisfactory, sensing or detecting a change in accelerations can provide an indication rather sooner. Gyroscopes and accelerometers are typical sensing means and a further means in an aerofoil mounted horizontally on the vehicle body 4 so as to pivot athwartships when the vehicle pitches. An aerofoil has an advantage that, once attached, there is no need for adjustment from time to time.

The flexible wall structure 5 can readily deflect to accommodate both large and small surface irregularities. The second stage 8 deflects readily to accommodate the relatively small surface irregularities leaving the first stage 7 to accommodate the relatively large surface irregularities.

A further advantage of the wall structure 5, in this case compared with the use of flexible wall members of the second stage 8 used per se, exists. This arises because the outer portions of the wall members must, if they are to be subjected only to tensile loads, incline inwardly and because, for reasons explained in the above-mentioned copending application Ser. No. 566,948 of Denys Bliss, the bottom edges of the side portions preferably extend substantially normal to the outer portions. For the same vehicle body to surface clearance, stage 8 flexible wall members used per se result in the use of more flexible material and a reduced effective cushion area than when used in combination with the inflated bag of the first stage 7.

I claim:

1. A gas-cushion vehicle wherein the cushion is contained, at least in part, by a flexible wall structure attached to the vehicle body and comprising a first stage in the form of an inflatable bag projecting part way across the lateral boundary of the cushion and a second stage formed by a series of separate channel-shaped sections of flexible material attached to the first stage so as to project from the first stage across a further part of said boundary, and means secured to said channel-shaped sections constraining said sections against deflection away from said cushion by the pressure of the gas therein.

2. A gas-cushion vehicle as claimed in claim 1 wherein the second stage comprises a succession of independently deflectable flexible wall members of inflatable construction each having an outer portion which extends away from the first stage and which faces the cushion so as to form part of a boundary surface and a pair of side portions which extend inwardly from said outer portion towards said cushion, a side portion of each wall member being contiguous with the adjacent side portion of a neighbouring wall member, the side portions acting as the said constraining means whereby inflation of said wall members by pressurized gas urges the contiguous side portions of neighbouring wall members towards each other.

3. A gas-cushion vehicle as claimed in claim 1 including means for detecting variations in the clearance between the vehicle body and the surface over which the vehicle is traveling, integrating means adapted to receive signals emitted by said detecting means, means for pulling at least the first stage of the wall structure towards the vehicle body, and control means operatively connected to said integrating means and to said pulling means so arranged that the attitude of the vehicle is maintained substantially constant relative to the surface therebeneath.

4. A gas-cushion vehicle as claimed in claim 1 including means for detecting variations in the clearance between the vehicle body and the surface over which the vehicle is traveling at the front and rear of the vehicle, integrating means adapted to receive signals emitted by said detecting means, means for pulling at least the first stage of the wall structure towards the vehicle body, and control means operatively connected to said integrating means and to said pulling means so arranged that the fore-to-aft attitude of the vehicle is maintained substantially constant when the vehicle is operating over irregularities having a wave length which is a submultiple of the vehicle length and is maintained substantially parallel to the mean surface of the profile of irregularities having a wave length several times the length of the vehicle.

5. A gas-cushion vehicle as claimed in claim 4 including means for causing fluid to issue from the bottom of the second stage of the wall structure in the form of a fluid curtain, and wherein said detecting means comprise devices responsive to pressure so as to sense variations in the pressure of fluid flowing to the bottom of said second stage.

6. A gas-cushion vehicle as claimed in claim 1 including means for detecting variations in the clearance between the vehicle body and the surface over which the vehicle is traveling at the sides of the vehicle, integrating means adapted to receive signals emitted by said detecting means, means for pulling at least the first stage of the wall structure towards the vehicle body, and control means operatively connected to said integrating means and to said pulling means so arranged that the side-to-side attitude of the vehicle is maintained substantially constant when the vehicle is in operation.

7. A gas-cushion vehicle as claimed in claim 6 including means for causing fluid to issue from the bottom of the second stage of the wall structure in the form of a fluid curtain, and wherein said detecting means comprise devices responsive to pressure so as to sense variation in the pressure of fluid flowing to the bottom of said second stage.

8. A gas-cushion vehicle as claimed in claim 1 wherein the maximum vertical dimension of the upper stage is at least equal to the maximum vertical dimension of the lower stage.

9. A gas-cushion vehicle wherein the cushion is contained, at leats in part, by a flexible wall structure attached to the vehicle body and comprising a first stage in the form of an inflatable bag projecting part way across the lateral boundary of the cushion and a second stage formed by a series of separate channel-shaped sections of flexible material attached to the first stage so as to project from the first stage across a further part of said boundary, said inflatable bag being formed from a series of interconnected sections arranged so that one section can deflect relative to a neighbouring section.

10. A gas-cushion vehicle as claimed in claim 9, wherein the second stage comprises a succession of independently deflectable flexible wall members of inflatable construction each having an outer portion which extends away from the first stage and which faces the cushion so as to form part of a boundary surface and a pair of side portions which extend inwardly from said outer portion towards said cushion, a side portion of each wall member being contiguous with the adjacent side portion of a neighbouring wall member, the side portions acting as constraining means which constrain the wall members against deflection away from said cushion by the pressure of gas therein, whereby inflation of said wall members by pressurised gas urges the contiguous side portions of neighbouring wall members towards each other.

References Cited

UNITED STATES PATENTS

| | | | |
|---|---|---|---|
| 3,211,246 | 10/1965 | Lewis | 180—127 |
| 3,240,282 | 3/1966 | Taylor | 180—128 |
| 3,347,329 | 10/1967 | Jones | 180—128 |

A. HARRY LEVY, *Primary Examiner.*

U.S. Cl. X.R.

180—127, 124